Aug. 19, 1930. A. P. DAVIS 1,773,172
GYROSCOPIC DIRECTION FINDER
Filed Dec. 3, 1923 3 Sheets-Sheet 1

INVENTOR
Arthur P. Davis
BY
ATTORNEYS

Aug. 19, 1930.                A. P. DAVIS                1,773,172
                        GYROSCOPIC DIRECTION FINDER
                 Filed Dec. 3, 1923           3 Sheets-Sheet 2
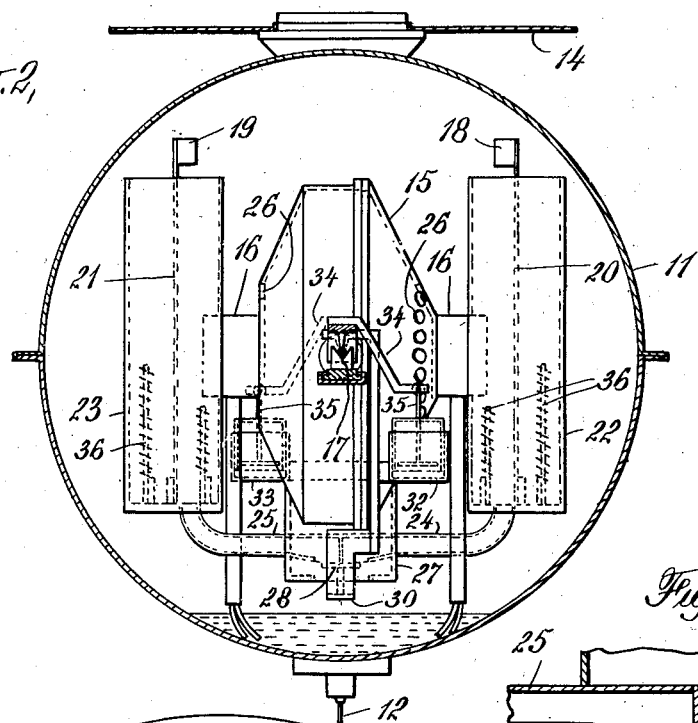
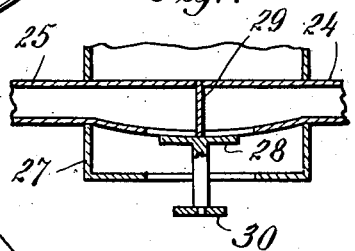
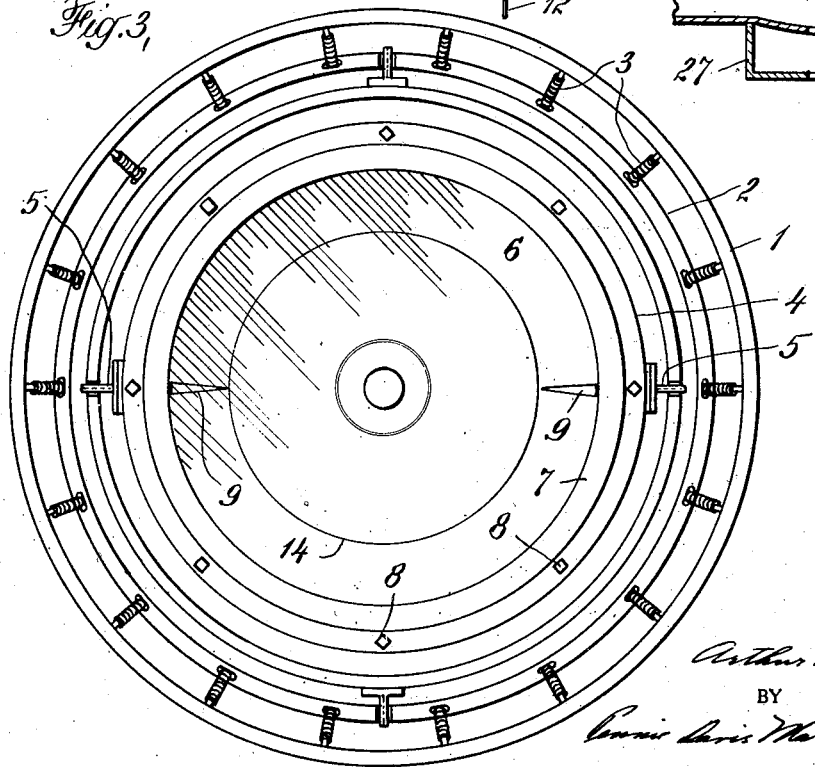
INVENTOR
BY
ATTORNEYS Aug. 19, 1930.                A. P. DAVIS                1,773,172
                    GYROSCOPIC DIRECTION FINDER
                      Filed Dec. 3, 1923        3 Sheets-Sheet 3
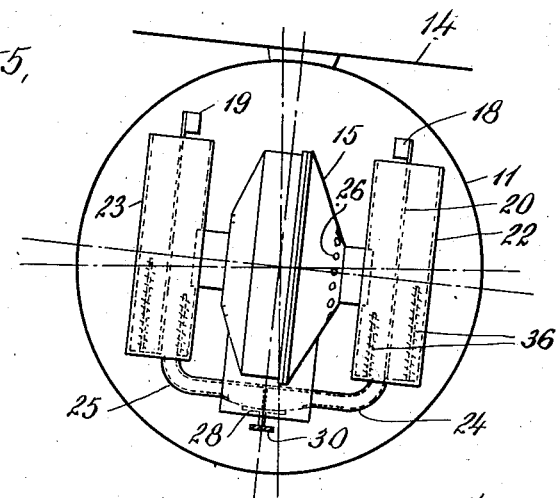
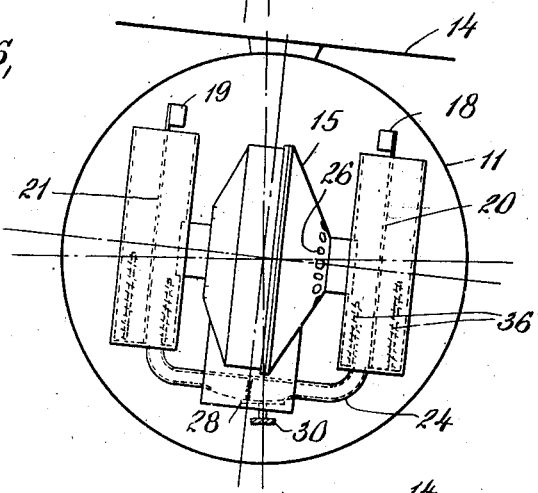
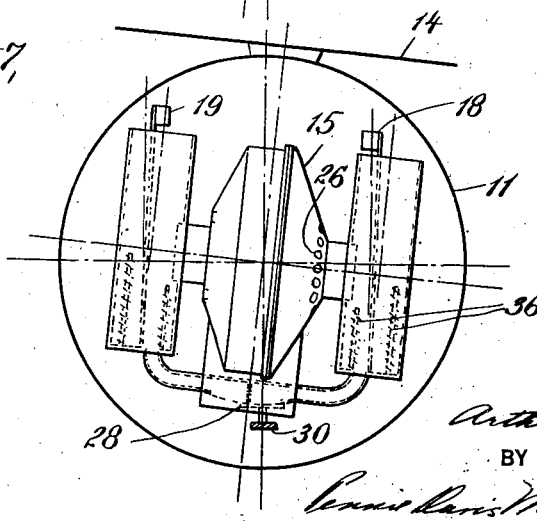

Patented Aug. 19, 1930

1,773,172

UNITED STATES PATENT OFFICE

ARTHUR PATTERSON DAVIS, OF NEW YORK, N. Y.

GYROSCOPIC DIRECTION FINDER

Application filed December 3, 1923. Serial No. 678,096.

This invention relates to direction finders or compasses of the gyroscopic type, the principal object of the invention being to provide improved means for controlling a single gyroscope whereby a substantial improvement in accuracy may be obtained. In general, the invention comprises a top-heavy gyroscope provided with a neutralizing pendulum yieldingly connected to the gyro casing, and also provided with a thermally controlled device adapted to alter the effect of the top-heavy mass so as to produce the necessary damping effect.

Where a gyroscope is used as a direction indicator, its operation must be controlled in such a manner that the gyroscope will precess towards the meridian whenever the gyro axle is inclined to the meridian; and the oscillations of the gyro axle about the meridian must be damped out within a reasonable time. Means must also be provided for preventing the disturbing forces arising from the oscillations of the vehicle (such as a ship) on which the gyro is mounted, from interfering with the accuracy of the indications. The controlling mechanism must therefore perform three distinct functions:

First. The application of a suitable force to the gyroscope to cause precession towards the meridian when the gyro axle is inclined to the horizontal due to the rotation of the earth. This may be termed the meridian seeking function.

Second. The checking and ultimate destruction of the oscillations of the gyro axle about the meridian within a reasonable time; i. e., the damping function.

Third. The prevention of the disturbing forces arising from the oscillations of the vessel or other vehicle carrying the gyroscope, from interfering with the accuracy of the indications.

For obvious reasons it is most desirable to have all three of these functions performed entirely within the sensitive part or direction seeking element of the compass so that no external agency (such as a follow-up system) need be employed.

It is well known that a pendulous gyroscope possesses meridian seeking qualities, and it is also true that a top-heavy gyroscope possesses meridian seeking qualities identical with those of a pendulous gyroscope, provided the direction of rotation of the gyroscope in the latter case be reversed. Therefore, other things being equal, either a pendulous or a top-heavy gyroscope gives satisfactory results so far as the meridian seeking function is concerned; and it is to be noted that both of these forms are subject to precisely the same disturbing forces when the vessel rolls while on an intercardinal direction.

I prefer to use a top-heavy gyroscope, in which case the undersirable effects which the disturbing forces arising from the oscillations of the vessel tend to produce, can be avoided almost entirely by employing a pendulum of such dimensions and arranged in such a manner that the pendulous effect equals and opposes the top-heavy effect when the gyroscope is subjected to these disturbing forces. In order that the pendulum may perform its intended function without interfering with the meridian seeking function of the gyroscope, the pendulum should be connected to the gyroscope casing by means of a slowly yielding connection, such as a dash pot. If the dash pot, or equivalent yielding connection, is properly adjusted, the entire gyroscope behaves with respect to rapidly reversing forces (such as those caused by the rolling of a vessel) as if it were in neutral equilibrium; however, a sustained inclination of the gyro axle arising from the earth's rotation will permit the pendulum to return slowly to its vertical position, thus allowing the top-heavy mass to exert its full effect upon the gyroscope which then precesses towards the meridian in the well-known manner. It is thus possible to obtain the meridian seeking qualities of a top-heavy gyroscope, and at the same time cause the gyroscope to remain in substantially neutral equilibrium with respect to forces produced by oscillations of the vessel.

The damping of the oscillations of the gyro axle about the meridian presents a difficult problem, particularly where this function is to be performed entirely within the sensitive element. In order to appreciate the nature of the conditions under which the damping mechanism must operate, it is helpful to consider the action of a top-heavy gyroscope provided with a pendulum arranged as above described. When the gyroscope becomes inclined because of the earth's rotation, the pendulum must return to approximately its normal position within a short period of time, for example, within two minutes, thus allowing the top-heavy mass to act on the gyroscope to precess it slowly towards the meridian. In order to damp the oscillations of the gyroscope about the meridian, it is necessary to decrease the effect of the top-heavy mass as time goes on, so that the rate of precession will be decreased when the gyro approaches its meridian position. Therefore, the top-heavy mass must slowly recover a part of its initial inclination, thus reducing the moment acting on the gyroscope and ultimately checking the oscillations about the meridian.

The means by which the effect of the top-heavy mass can be gradually decreased in order to effect the proper damping of the system, may be best understood by considering the particular embodiment of the invention illustrated in the accompanying drawings. The following detailed description and the accompanying drawings disclose the preferred embodiment of the invention, and the various objects and advantages of the invention will be apparent upon considering this particular embodiment. In the drawings Fig. 1 is a vertical section view of my improved gyroscopic compass.

Fig. 2 is a vertical section view taken on line 2—2 of Fig. 1 showing the details of construction.

Fig. 3 is a plan view of the improved gyroscope compass.

Fig. 4 is an enlarged sectional view of a valve mechanism forming a part of the compass illustrated in Figs. 1 to 3, inclusive, and Figs. 5, 6 and 7 are diagrammatic views of the improved gyroscopic compass, illustrating its mode of operation.

Figure 1:
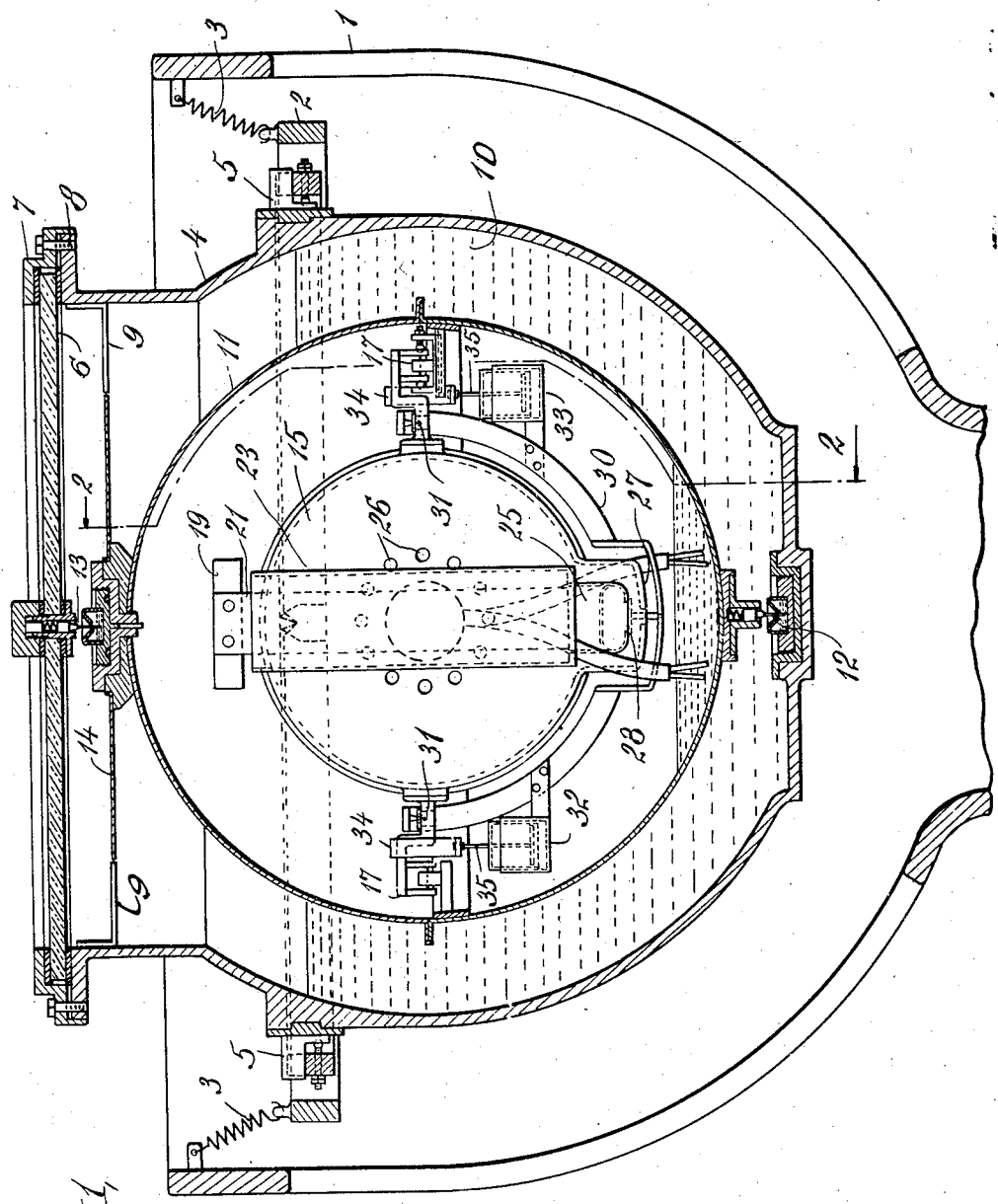

Figs. 1 and 3 show the ordinary binnacle 1, supporting a ring 2 by means of a plurality of springs 3. A compass casing 4 is in turn supported by the ring 2 by means of suitable trunnions 5, 5. The casing 4 is provided with a glass cover 6, held in place by a suitable clamping ring 7 which may be fixed to the casing 4 by means of small bolts 8; and two stationary pointers 9, 9 are fixed to the upper part of this casing. The casing 4 contains a liquid 10 which supports a substantially spherical casing 11, this casing being held in place by two vertical guide bearings 12 and 13 of ordinary construction. The casing 11 carries a compass card 14 which cooperates with a lubber line on the pointers 9, 9 to give direction indications. The gyroscope proper is mounted within a gyro casing 15, the axle of the gyro being supported in suitable bearings 16, 16, forming part of the gyro casing. This casing 15 is supported within the floating casing 11 by means of knife edge supports 17, the casing 15 being mounted so that it may rotate about an axis at right angles to the axis of the gyro wheel.

The gyro wheel and its casing 15 are made top-heavy by means of two weights 18 and 19 which are supported at the free ends of two upright strips of thermostatic metal 20 and 21. These strips are supported within casings 22 and 23, fixed to the gyro casing 15 in any convenient manner, such as by the tubes 24 and 25 which serve another purpose in addition to fixing the parts together. Electric heating elements 36 are provided within the casings 22 and 23 for heating the strips of thermostatic metal 20 and 21.

It will be noted that the gyro casing 15 is provided with a plurality of small openings 26 near each of the bearings 16, the purpose of these openings being to admit air to the gyro casing near the center thereof. The gyro casing is open at the bottom, and provided with a depending portion 27 which is fixed to the tubes 24 and 25 and forms a partial enclosure for a valve 28. By referring to Fig. 4 it will be noted that tubes 24 and 25 are separated by a partition 29 and that each of the tubes is provided with an opening facing downward within the enclosing casing 27. Valve 28 is adapted partially to cover each of these openings, and to control the supply of air to these pipes in a manner hereinafter described.

The means for preventing the forces arising from the oscillations of the vessel, from affecting the operation of a gyroscopic unit, consists of a pendulum in the form of a yoke 30, supported on the axle of the gyro casing 15 by knife edges 31. The valve 28, above referred to, is carried by the yoke 30; and this yoke is connected to the gyro casing 15 by means of two yielding connections in the form of dash pots 32 and 33. The cylinders of the two dash pots are fixed to the yoke 30 and the pistons of the dash pots are connected to an irregularly shaped bar 34 (see Fig. 2) by means of piston rods 35. The bar 34 is fixed to the gyro casing and the piston rods 35 are pivoted to the ends of this bar so that relative movement may take place between the yoke 30 and the casing 15. The dash pots 32 and 33 should be adjusted so that the pendulous yoke 30 will return to its vertical position within a relatively short period of time after it has been deflected. This yoke should return to substantially its vertical position within approximately two minutes after the gyro axis has become inclined by virtue of the earth's rotation.

The size and proportions of the yoke 30 should be such that when the yoke and the weights 18 and 19 are in their normal or vertical positions, the gyro casing is in neutral equilibrium. The weights 18 and 19 should have no effect on the system until the yoke 30 gets out of alignment with the weight supports 20 and 21. When this occurs, the gyro casing 15 is rendered top heavy by the action of the weights 18 and 19 disposed near the top thereof. These weights then exert a moment on the gyro casing acting about the horizontal axis through the bearing supports 31, 31; and this moment causes the gyro to precess towards the meridian in the well-known manner.

Unless the effect produced by the weights 18 and 19 is modified in some way, the gyro axle will continue to oscillate about its meridian position and thus render the compass wholly unsatisfactory. It is necessary to provide some means for counteracting or neutralizing the moment exerted by the weights 18 and 19, in such a manner that it is gradually diminished.

If some moment were to be applied for the purpose of damping the oscillations of the gyro axle about its meridian position, this moment should always oppose the moment exerted by the weights 18 and 19, and it should be proportional to the velocity of the gyro axle as it oscillates about its meridian position. When the gyro axle is in either extreme position, its angular velocity is zero and no damping force is necessary. On the other hand, when the gyro axle is crossing the meridian its velocity is a maximum and the opposing damping force should also be a maximum at this instant.

Since it is true that the effect of a satisfactory damping force of the character above described is virtually to neutralize the effect of the top-heavy mass to a certain extent, it is conceivable that the same result might be accomplished by shifting the top-heavy mass or masses (as the case may be) so that the moment exerted by the mass is diminished, the diminution of the moment being proportional to the velocity of the gyro axle. Accordingly, I prefer to construct the compass in such a manner that the top-heavy mass can be shifted to produce the effect just described. When the gyro axle is oscillated about the meridian position, the axle is inclined to the horizontal the maximum amount when it crosses the meridian, the axle of course being substantially horizontal when it occupies either extreme position away from its meridian position. This characteristic feature of the gyroscope is utilized in changing the positions of the weights 18 and 19 to produce the desired damping effect.

The manner in which the damping function is performed may be best understood by considering Figs. 5, 6 and 7 of the accompanying drawings, which illustrate, in an exaggerated manner, the conditions that exist at several stages in the operation of the damping system. Fig. 5 shows the condition existing when the gyro axle is first inclined to the horizontal, due to the rotation of the earth. The condition represented in this figure is a temporary condition only. The oscillations of the vessel have no effect on the various parts of the apparatus and they are not displaced relatively to each other for no moment is created by the oscillations which would tend to cause precession of the gyroscope. When this condition is brought about by virtue of the earth's rotation, the inclination of the gyroscope axle persists for a considerable time, and the yoke 30 returns to its vertical or normal position as shown in Fig. 6. The weights 18 and 19 do not return to their normal positions because of the sustained inclination of the gyroscope axle, and therefore these weights exert a moment which causes precession of the gyroscope toward the meridian.

The rotating gyro wheel draws air in through the openings 26 in the gyro casing 15 and expels this air through the open bottom of the casing 15 and the casing extension 27. Part of the air so discharged from the gyro casing 15 passes into the two upright casings 22 and 23 through the pipes 24 and 25. It is to be noted that the valve 28 in Figs. 2 and 5 is disposed in alignment with the partition 29 which separates the two tubes 24 and 25. This permits the same amount of air to flow into each of the casings 22 and 23, and for this reason, the heat generated by the heating elements 36 is dissipated to the same extent in each of the casings 22 and 23 and the temperatures of both the upright strips of thermostatic metal 20 and 21 are equal.

When the condition illustrated in Fig. 6 obtains, more air flows into the casing 23 than flows into the casing 22, for the reason that the valve 28 has nearly closed the opening in pipe 24, and the port opening into the pipe 25 is almost completely uncovered. The effect of this unequal distribution of the air expelled from the gyro casing is to cool the thermostatic strip 21 and increase the temperature of the thermostatic strip 20. This is due to the fact that the reduced quantity of air flowing into the casing 22 carries away the heat generated within casing 22 at a very slow rate, while the air flowing into the casing 23 carries away the heat generated therein at an increased rate. The effect of the unequal temperatures of the strips 20 and 21 is to cause these strips to move toward the vertical. These strips of course carry the weights 18 and 19 with them and the effect is to reduce the moment exerted by these weights about the horizontal axis through the supports 31, 31. Figure 7 shows, in exaggerated form, the condition existing after the weights 18 and 19 have been moved to their new positions. The various parts should be adjusted so that the weights 18 and 19 are deflected from their normal positions the maximum amount when the gyro axle is crossing the meridian, for it is at this instant that the damping effect should be a maximum.

The use of electrically controlled heating elements within the casings 22 and 23 makes it possible to secure a nice adjustment of the several parts, whereby very accurate direction indications can be obtained.

It is to be observed that a change of temperature due to a change in atmospheric conditions, produces no undesirable effect on my improved gyro compass. This is true for the reason that when the temperatures of both strips 20 and 21 are increased the same amount, these strips will either move toward each other or away from each other, as the case may be.

It is not unusual to connect a penduluos element to a gyro casing by means of dash pots for the purpose of making the casing pendulous and to secure the necessary damping effect, but it will be noted that the yoke 30 of this invention does not make the gyro casing pendulous. It is used for an entirely different purpose. The dash pots 32 and 33 are adjusted so as to permit the yoke 30 to swing back to its vertical position in a short period of time, for example within approximately two minutes after it has been deflected. Where a pendulous yoke and a dash pot are used for the purpose of damping the oscillations of the gyro axle and to impart the direction seeking property to the system, the dashpot or other yielding connection must be adjusted to act very slowly.

This invention comprises a simple arrangement of inexpensive parts, and possesses the distinct advantage that the various parts can be readily adjusted so as to produce very accurate indications. The size and proportions of the valve 28 may easily be varied so as to produce any desired adjustment of the apparatus. The number of moving parts is reduced to a minimum, and it is obvious that the weights 18 and 19, the thermostatic strips 20 and 21, and the various other parts would seldom if ever get out of order.

It is to be understood that this invention is not limited to the particular embodiment illustrated and described, but includes such modifications thereof as fall within the scope of the appended claims.

I claim:

1. A device of the type described, comprising the combination of a gyroscope, an independent weight mounted on each side of said gyroscope, the said weights being arranged so that they can render the gyroscope top heavy, and means controlled by movement of the gyro axle away from the horizontal, for moving said weights with respect to said gyroscope, whereby the oscillations of the gyro axle about the meridian are damped.

2. A device of the type described, comprising the combination of a gyroscope, a thermostatic strip mounted on each side of said gyroscope, a weight connected to each strip, the said weights being arranged so that they can render the gyroscope top heavy, and means controlled by movement of the gyro axle away from the horizontal, for changing the temperatures of said strips.

3. A device of the type described, comprising the combination of a gyroscope, a thermostatic strip mounted on each side of said gyroscope, means for heating said strips, a weight carried by each of said strips, the said weights being arranged so that they can render the gyroscope top heavy, and means controlled by movement of the gyro axle away from the horizontal for causing air to flow into close proximity to said strips, to control the temperatures thereof.

4. A device of the type described, comprising the combination of a gyro wheel, a casing therefor, a thermostatic strip at each side of said casing and carried thereby, means for heating said strips, a weight carried by each of said strips, a pendulous member associated with said gyro casing, and means including an air directing device controlled by said member for causing air discharged from said casing to come into close proximity to said strips to control the temperature thereof.

5. A device of the type described, comprising the combination of a gyro wheel, a casing therefor, a thermostatic strip on each side of said casing and carried thereby, means for heating said strips, a weight carried by each of said strips, a pendulous member, means for yieldingly connecting this member to said gyro casing, and means controlled by relative movement between the casing and said member for causing air from said casing to come into close proximity to said strips to control the temperatures thereof.

6. A device of the type described, comprising the combination of a gyro wheel, a casing therefor, a thermostatic strip on each side of said casing, an air connection between said casing and each of said strips, means for heating said strips, a weight carried by each of said strips, a pendulous member, means for yieldingly connecting said pendulous member with said gyro casing, and means carried by said member for causing air from said casing to flow into said air connections upon relative movement between the member and the casing for the purpose described.

7. A device of the type described, comprising the combination of a gyro wheel, a casing therefor, a thermostatic strip on each side of said casing, a casing surrounding each of said strips, means within the casings for said strips for heating said strips, an air connection between said gyro casing and each of the casings enclosing said strips, a weight carried by each of said strips, a pendulous member, means for yieldingly connecting said pendulous member with said gyro casing, and means carried by said member for causing air from said gyro casing to flow into said air connections upon relative movement between the member and casing for the purpose described.

8. A device of the type described, comprising the combination of a gyro wheel, a casing therefor, a thermostatic strip on each side of said casing, a casing surrounding each of said strips, electric heating elements within the casings enclosing said strips for heating said strips, an air connection between said gyro casing and each of the casings enclosing said strips, a weight carried by each of said strips, a pendulous member, means for yieldingly connecting said pendulous member with said gyro casing, and a valve member carried by said pendulous member for causing air from said gyro casing to flow into said air connections upon relative movement between the member and the casing for the purpose described.

9. A device of the type described comprising the combination of a gyroscope having its spin axis normally horizontal, a pendulous member, yielding means connecting said member to said gyroscope to hold the gyroscope in substantially neutral equilibrium, and static means adapted to exert a counter moment to render the gyroscope top heavy when the gyroscope becomes inclined from normal position, said means being controlled by relative inclination between the member and gyroscope for governing said static means to gradually decrease the moment whereby the oscillations of the gyroscope are damped.

10. A device of the type described comprising the combination of a gyroscope having its spin axis normally horizontal, a pendulous member, yielding means connecting said member to said gyroscope and adapted to exert a moment to hold the gyroscope in substantially neutral equilibrium, and static means adapted to exert a counter-moment for rendering the gyroscope top heavy when it moves out of the position of substantial neutral equilibrium, the said means for rendering the gyroscope top heavy being controlled by relative movement between said member and the gyroscope to gradually minimize the moment exerted thereby as the gyroscope precesses toward the meridian, whereby oscillations about the meridian are damped.

11. A device of the type described comprising the combination of a gyroscope having its spin axis normally horizontal, a pendulous member, yielding means connecting said member to said gyroscope to hold the latter in substantially neutral equilibrium, and means adapted to exert a moment for rendering the gyroscope top heavy when the gyroscope becomes inclined from normal position, the said pendulous member being adapted to exert a moment, counteracting the moment exerted by the means for rendering the gyroscope top heavy, and thereby lessen the moment when the gyroscope approaches substantially normal equilibrium, whereby oscillations of the gyroscope are damped.

12. A device of the type described comprising the combination of a gyroscope having its spin axis normally horizontal, a pendulous member carried thereby and adapted to hold the gyroscope in substantially neutral equilibrium, means for rendering the gyroscope top heavy when it moves out of a position of substantially neutral equilibrium, yielding means between said member and the gyroscope permitting relative movement between them to cause said member to exert a moment on said gyroscope for a predetermined period of time after the gyroscope spin axis has become inclined to the horizontal, and means controlled by relative movement between the member and the gyroscope for governing said means for rendering the gyroscope top heavy to damp the oscillations of the gyroscope spin axis about the meridian.

13. A device of the type described comprising the combination of a gyroscope having its spin axis normally horizontal, a pendulous member carried thereby and adapted to hold the gyroscope in substantially neutral equilibrium, means carried by said gyroscope for rendering the same top heavy when it moves out of a position of substantially neutral equilibrium, yielding means between said member and said gyroscope permitting relative movement between them for a predetermined period of time after the gyroscope and pendulous member have become inclined, and means controlled by the said relative movement to govern said first named means for varying the countermoment exerted thereby to damp the oscillations of the gyroscope spin axis.

14. A device of the type described comprising the combination of a gyroscope having its spin axis normally horizontal, a pendulous member yieldingly connected to said gyroscope and adapted to hold the same in a substantially neutral equilibrium, static means adapted to exert a moment on said gyroscope by rendering the same top heavy when it moves out of a position of substantially neutral equilibrium, and means controlled by relative movement between the gyroscope and said pendulous member upon inclination thereof for reducing the moment exerted by said first named means whereby the oscillations of the gyroscope spin axis are damped.

In testimony whereof I affix my signature.

ARTHUR PATTERSON DAVIS.